(12) United States Patent
Seemann (10) Patent No.: US 7,996,444 B2
(45) Date of Patent: Aug. 9, 2011

(54) CREATION OF PRE-FILTERS FOR MORE EFFICIENT X-PATH PROCESSING

(75) Inventor: Normen Seemann, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/033,007

(22) Filed: Feb. 18, 2008

(65) Prior Publication Data

US 2009/0210383 A1    Aug. 20, 2009

(51) Int. Cl.
*G06F 17/30* (2006.01)

(52) U.S. Cl. .......................... 707/811; 707/755

(58) Field of Classification Search .................. 707/755, 707/811, 3, 4, 999.003, 999.004
See application file for complete search history.

(56) References Cited

U.S. PATENT DOCUMENTS

| | | | |
|---|---|---|---|
| 7,096,224 B2 * | 8/2006 | Murthy et al. ................. | 707/763 |
| 7,162,485 B2 | 1/2007 | Gottlob et al. | |
| 7,165,063 B2 * | 1/2007 | Beyer et al. ................... | 707/706 |
| 7,406,478 B2 * | 7/2008 | Agrawal et al. ............... | 707/803 |
| 7,574,652 B2 * | 8/2009 | Lennon et al. ................ | 715/248 |
| 7,698,341 B2 * | 4/2010 | Rubendall ..................... | 707/755 |
| 7,752,212 B2 * | 7/2010 | Heifets et al. ................. | 707/755 |
| 7,809,734 B2 * | 10/2010 | Itoh et al. ...................... | 707/752 |
| 7,827,177 B2 * | 11/2010 | Murthy .......................... | 707/736 |
| 2002/0107973 A1 * | 8/2002 | Lennon et al. ................ | 709/231 |
| 2002/0152267 A1 * | 10/2002 | Lennon ......................... | 709/203 |
| 2003/0018607 A1 * | 1/2003 | Lennon et al. ................. | 707/1 |
| 2003/0115065 A1 * | 6/2003 | Kakivaya et al. ........... | 704/270.1 |
| 2004/0010752 A1 | 1/2004 | Chan et al. | |
| 2004/0015783 A1 * | 1/2004 | Lennon et al. ................ | 715/523 |
| 2004/0044659 A1 * | 3/2004 | Judd et al. ......................... | 707/3 |
| 2004/0068487 A1 * | 4/2004 | Barton et al. ..................... | 707/3 |
| 2004/0148278 A1 * | 7/2004 | Milo et al. ........................ | 707/3 |
| 2004/0181543 A1 * | 9/2004 | Wu et al. ....................... | 707/102 |
| 2004/0267760 A1 * | 12/2004 | Brundage et al. ............. | 707/100 |
| 2005/0022115 A1 * | 1/2005 | Baumgartner et al. ....... | 715/513 |
| 2005/0050066 A1 | 3/2005 | Hughes | |
| 2005/0060647 A1 * | 3/2005 | Doan et al. .................... | 715/514 |
| 2005/0097084 A1 * | 5/2005 | Balmin et al. .................... | 707/3 |
| 2005/0198065 A1 * | 9/2005 | Eppley et al. ............... | 707/104.1 |

(Continued)

FOREIGN PATENT DOCUMENTS

JP   2007034763 A   2/2007

OTHER PUBLICATIONS

Huang, Chia-Hsin, "XML Evolution: A Two Phase XML Processing Model Using XML Prefiltering Techniques," ACM, Sep. 2006, pp. 1215-1219.*

(Continued)

*Primary Examiner* — Luke S. Wassum
*Assistant Examiner* — Alexandria Y Bromell
(74) *Attorney, Agent, or Firm* — Rabindranath Dutta; Konrad Raynes & Victor LLP (57) ABSTRACT

A system and method is provided for XML query processing includes an execution compiler for transforming an XML query into an executable XML query plan. A query rewrite processor performs query transformation on the XML query, the query transformations including transforming an XPath within said XML Query into a pre-filter. The XML query is then transformed into a transformed XML query which includes the pre-filter.

16 Claims, 3 Drawing Sheets

U.S. PATENT DOCUMENTS

| | | | |
|---|---|---|---|
| 2005/0203957 A1 | 9/2005 | Wang et al. | |
| 2005/0228768 A1* | 10/2005 | Thusoo et al. | 707/1 |
| 2005/0229158 A1* | 10/2005 | Thusoo et al. | 717/115 |
| 2005/0257201 A1 | 11/2005 | Rose et al. | |
| 2005/0273772 A1* | 12/2005 | Matsakis et al. | 717/136 |
| 2005/0289125 A1* | 12/2005 | Liu et al. | 707/3 |
| 2006/0026168 A1* | 2/2006 | Bosworth et al. | 707/10 |
| 2006/0030292 A1* | 2/2006 | Bosworth et al. | 455/408 |
| 2006/0031228 A1* | 2/2006 | Bosworth et al. | 707/10 |
| 2006/0031256 A1* | 2/2006 | Bosworth et al. | 707/104.1 |
| 2006/0031264 A1* | 2/2006 | Bosworth et al. | 707/200 |
| 2006/0053368 A1* | 3/2006 | Bosworth et al. | 715/513 |
| 2006/0101058 A1* | 5/2006 | Chidlovskii | 707/102 |
| 2006/0117073 A1* | 6/2006 | Bosworth et al. | 707/201 |
| 2006/0167928 A1* | 7/2006 | Chakraborty et al. | 707/102 |
| 2006/0173985 A1* | 8/2006 | Moore | 709/223 |
| 2006/0218194 A1 | 9/2006 | Yalamanchi | |
| 2006/0224627 A1* | 10/2006 | Manikutty et al. | 707/104.1 |
| 2006/0235839 A1* | 10/2006 | Krishnaprasad et al. | 707/4 |
| 2006/0242115 A1* | 10/2006 | Baras et al. | 707/2 |
| 2006/0265489 A1* | 11/2006 | Moore | 709/223 |
| 2006/0265689 A1* | 11/2006 | Kuznetsov et al. | 717/117 |
| 2007/0016604 A1* | 1/2007 | Murthy et al. | 707/102 |
| 2007/0034763 A1 | 2/2007 | Kitazawa | |
| 2007/0038985 A1* | 2/2007 | Meijer et al. | 717/137 |
| 2007/0055658 A1 | 3/2007 | Hsiao et al. | |
| 2007/0061266 A1* | 3/2007 | Moore et al. | 705/51 |
| 2007/0061393 A1* | 3/2007 | Moore | 709/201 |
| 2007/0061487 A1* | 3/2007 | Moore et al. | 709/246 |
| 2007/0083807 A1 | 4/2007 | Shaudys et al. | |
| 2007/0106536 A1* | 5/2007 | Moore | 705/3 |
| 2007/0106537 A1* | 5/2007 | Moore | 705/3 |
| 2007/0106750 A1* | 5/2007 | Moore | 709/217 |
| 2007/0106751 A1* | 5/2007 | Moore | 709/217 |
| 2007/0106752 A1* | 5/2007 | Moore | 709/217 |
| 2007/0106753 A1* | 5/2007 | Moore | 709/217 |
| 2007/0106754 A1* | 5/2007 | Moore | 709/217 |
| 2007/0116036 A1* | 5/2007 | Moore | 370/462 |
| 2007/0116037 A1* | 5/2007 | Moore | 370/462 |
| 2007/0168461 A1* | 7/2007 | Moore | 709/217 |
| 2008/0005086 A1* | 1/2008 | Moore | 707/3 |
| 2008/0040151 A1* | 2/2008 | Moore | 705/2 |
| 2008/0040657 A1* | 2/2008 | Kuznetsov et al. | 715/234 |
| 2008/0065590 A1* | 3/2008 | Castro et al. | 707/2 |
| 2008/0065674 A1* | 3/2008 | Liu et al. | 707/102 |
| 2008/0072306 A1* | 3/2008 | Krasnoiarov et al. | 726/12 |
| 2008/0097959 A1* | 4/2008 | Chen et al. | 707/2 |
| 2008/0097974 A1* | 4/2008 | Chen et al. | 707/4 |
| 2008/0120321 A1* | 5/2008 | Liu et al. | 707/102 |
| 2008/0133465 A1* | 6/2008 | Lee et al. | 707/2 |
| 2008/0140645 A1* | 6/2008 | Denoual | 707/5 |
| 2008/0154868 A1* | 6/2008 | Ozcan et al. | 707/4 |
| 2008/0183674 A1* | 7/2008 | Bush et al. | 707/3 |
| 2008/0189303 A1* | 8/2008 | Bush et al. | 707/100 |
| 2008/0196016 A1* | 8/2008 | Todd | 717/143 |
| 2008/0222087 A1* | 9/2008 | Balmin et al. | 707/2 |
| 2008/0222187 A1* | 9/2008 | Beyer et al. | 707/102 |
| 2008/0294604 A1* | 11/2008 | Goswami | 707/3 |
| 2008/0320382 A1* | 12/2008 | Kuznetsov et al. | 715/234 |
| 2009/0006314 A1* | 1/2009 | Balmin et al. | 707/2 |
| 2009/0006316 A1* | 1/2009 | Fan et al. | 707/2 |
| 2009/0006447 A1* | 1/2009 | Balmin et al. | 707/102 |
| 2009/0037379 A1* | 2/2009 | Bou-Diab et al. | 707/3 |
| 2009/0055432 A1* | 2/2009 | Smith et al. | 707/103 R |
| 2009/0063401 A1* | 3/2009 | Harbarth et al. | 707/2 |
| 2009/0063533 A1* | 3/2009 | Ting | 707/102 |
| 2009/0083239 A1* | 3/2009 | Colgrave et al. | 707/4 |
| 2009/0210631 A1* | 8/2009 | Bosworth et al. | 711/141 |
| 2009/0300656 A1* | 12/2009 | Bosworth et al. | 719/320 |
| 2010/0070448 A1* | 3/2010 | Omoigui | 706/47 |

OTHER PUBLICATIONS

Yanlei Diao et al., "YFilter: Efficient and Scalable Filtering of XML Documents," IEEE, 2002.*

Park et al., "Optimization of XQuery Queries Including FOR Clauses," in IEEE Computer Society, 2nd Int'l Conference on Internet and Web Applications, 2007.

Diao et al., "YFilter: Efficient and Scalable Filtering of XML Documents," in IEEE Computer Society, Procdgs. of the 18th Int'l Conference on Data Engineering 2002.

Groppe et al., "XPath Query Simplification with Regard to The Elimination of Intersect and Except Operators," in IEEE Comp. Soc. Procdgs of the 22nd Int'l Conf. on . . . 2006.

Wang et al., "Optimization of Nested XQuery Expressions with Orderby Clauses," in IEEE Com. Soc. Procdgs of the 21st Int'l Conf. on—2005.

English Abstract & Machine Translation for JP2007034763A, published Feb. 8, 2007, Total 40 pp.

* cited by examiner

CREATION OF PRE-FILTERS FOR MORE EFFICIENT X-PATH PROCESSING

FIELD OF INVENTION

The present invention generally relates to computer implemented database management systems, and particularly to systems and methods for more efficient XPath/XQuery processing.

BACKGROUND

The extensible markup language (XML) is a flexible tag-based markup language suitably used to store data for posting on the Internet or local intranets, wide area networks, or the like. XML is increasingly being used as a native language for data storage in database management systems. In these and other XML applications, it is advantageous to have a flexible XML query language for creating and modifying XML documents, for efficiently and selectively retrieving data from XML documents or collections of XML documents, for sorting data, for inputting data into XML documents, and for otherwise manipulating XML items and data. Various XML query languages have been developed, including XML-QL, XQL, Quilt, and XQuery.

XML employs markup tags to classify, group, interrelate, or otherwise provide metadata regarding data stored in XML documents. An XML query can be viewed as producing streams of sequences of items. In a tabular notation using one column, each separately processed sequence comprising an XML item or a concatenation of XML items is suitably viewed as a row, while each XML item within a row is suitably viewed as an XML item, fragment, or row element. Such terminology is used herein to provide a convenient tabular visualization of the data; however, the use of such terminology does not imply that the data is stored or processed in tabular format.

In typical query processing, an XML query is constructed by a user, a software module, or the like, and is converted from a textual format to a data flow model. At the data flow model level, query rewrites of identified inefficient data flow structures are performed to optimize the data flow model. A query rewrite is a query transformation that produces a more efficient query without changing the query output. The optimized data flow model is compiled into executable instructions. Optionally, query rewriting is performed at a lower level than the data flow model, such as at the executable instructions level. It will be appreciated that the executable instructions substantially correspond to a data flow model written in a specific executable instruction set. Similarly, the query text substantially corresponds to a data flow model written in a high level text-based language, and so optionally query rewrites are performed at the text query level. Typically, however, the XML query is converted into an intermediate data flow model which formats the XML query in a manner well-suited for efficient XML query rewrite processing.

Regardless of the processing level at which query rewrites are performed, the query rewrites perform various optimization tasks such as reducing XML item sequence construction, reducing usage of memory for temporary data storage, promoting data flow pipelining, improving index usage and improving I/O behavior. For XQuery, heuristics may be applied, such as "try to express the whole query with as few FLOWR expressions as possible" or "apply filters and extractions early during data processing" in the form of rewrite rules (or rewrites). However, there are problems which arise when queries are rewritten in order to evaluate XPath expressions as early as possible in order to filter out unwanted items in a more efficient way.

Some of these problems are associated with a query rewrite technique known as extraction push down of Xpath in which an XPath extraction is moved/pushed into a lower (closer to base table) query block without changing the semantics of the query, but possibly changing the result of the lower query block. One example is known as the multiple consumer problem, which occurs when an extraction pushdown cannot be performed since other parts of the same query refer to the result of the lower query block that it is being pushed into.

Accordingly, there is a need for systems and methods for increasing the efficiency of the processing of XML queries. There is also a need for systems and methods for rewriting queries to filter out unwanted items more efficiently while avoiding issues such as the multiple-consumer problem.

SUMMARY OF THE INVENTION

To overcome the limitations in the prior art briefly described above, the present invention provides a method, computer program product, and system for querying an XML document.

In one embodiment of the present invention an XML query rewrite method comprises identifying an XPath within an XML query; and transforming the XPath into a pre-filter of the XML query.

In another embodiment of the present invention, an XML query rewrite method for processing an XML query comprises: identifying an XPath within the XML query; transforming the XPath into a pre-filter; executing the pre-filter; and executing the XML query after the execution of the pre-filter.

In a further embodiment of the present invention an XML compilation processor comprises: an execution compiler transforming an XML query into an executable XML query plan; a query rewrite processor performing query transformation on the XML query, the query transformations including transforming an XPath within the XML Query into a pre-filter; and transforming the XML query into a transformed XML query including the pre-filter.

In an additional embodiment of the present invention comprises an article of manufacture for use in a computer system tangibly embodying computer instructions executable by the computer system to perform process steps for querying an XML document, the process steps comprising: identifying an XPath within the XML query; transforming the XPath into a pre-filter; executing the pre-filter; and executing the XML query after the execution of the pre-filter.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

The present invention overcomes the problems associated with the prior art by teaching a system, computer program product, and method for efficient processing of XML queries using pre-filters. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The present invention provides a system and method of using pre-filters in an XQuery processor. The invention addresses problems which arise when queries are rewritten in order to evaluate XPath expressions as early as possible in order to filter out unwanted items in a more efficient way. The invention does this by executing a pre-filter before the execution of the original XPath expression. The execution of the pre-filter removes unwanted data early on. As a result, other costly operations are performed on a reduced set of data and run-time performance may be significantly improved. Also, the techniques of the present invention may improve index usage.

Figure 1:
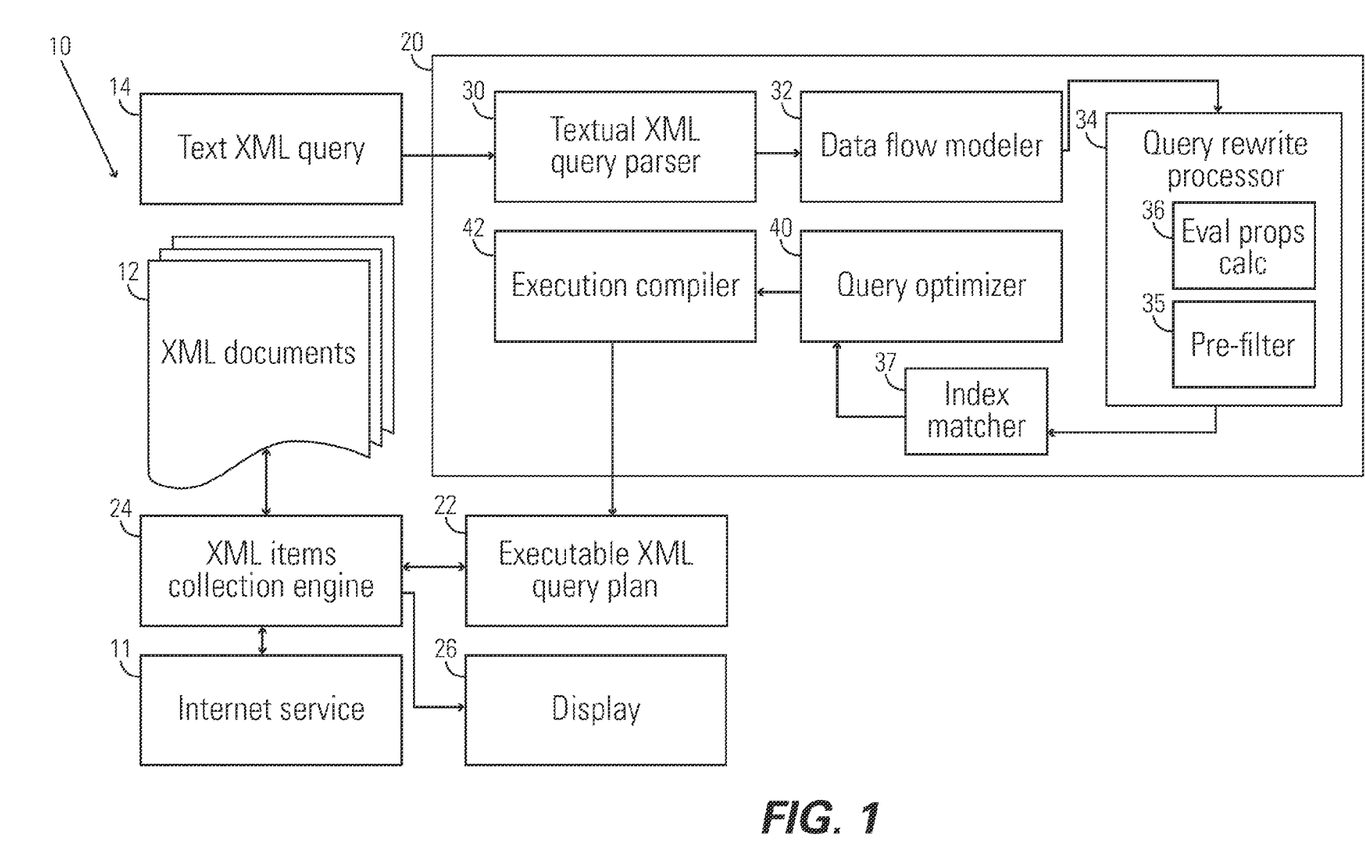
FIG. 1 shows a block diagram of an XQuery processor in accordance with one embodiment of the invention.

FIG. 1 shows a block diagram of an XQuery processor 10 in accordance with one embodiment of the invention. A query is performed on a data stream of items of an XML data type produced by an extensible markup language (XML) source. The data stream of XML items may be extracted from an Internet service 11, from one or more XML documents 12, or from another source of XML items. Although XML documents 12 are shown in FIG. 1, the data stream processed by the query may be extracted from a document formatted in another tag-based markup language, such as a data stream of hypertext markup language (HTML) items extracted from one or more HTML documents. Similarly, the Internet service may supply a data stream of HTML items. A textual XML query 14 is constructed by a user, by an application program, or the like.

The textual XML query 14 is preferably constructed in accordance with XQuery, which is a commonly used XML query language. However, other XML query constructions can be employed in which XML documents are processed as data streams of sequences of XML fragments or XML items. In XQuery, for example, data streams of XML items and sequences of items are constructed using FLWOR expressions in which FOR clauses produce data streams of individual XML items, LET clauses produce concatenated sequences of XML items, combination of FOR and LET clauses cause a Cartesian product of the produced streams, WHERE clauses provide filtering based on predicate expressions, and the RETURN clause causes the computation of the result that is flowed to a subsequent operation. The FLWOR expression is used as an example herein; other XQuery expressions also can create LET and FOR data flow, henceforth called LET and FOR quantifiers. Example data flow stream transformations are described herein with reference to the preferred XQuery syntax; however, these exemplary data flow stream transformations are readily adapted to other XML query languages that may employ different syntax, clause names, or the like for producing data streams of single XML items, concatenated sequences of XML items, or combinations thereof.

The textual XML query 14 is processed by a compilation processor 20 to produce an executable XML query plan 22, which, when executed, accesses the Internet service 11 to receive, sort, search, transmit, or otherwise process data content from or to the Internet service 11, accesses the XML documents 12 to store, read, sort, search, or otherwise process data content of the XML documents 12, or otherwise interacts with a source or repository of XML items.

In a read operation, an XML items collection engine 24 formats a data stream of XML items extracted from the Internet service 11, the XML documents 12, or other source of XML items into a query data model or other suitable format that is received by the executing XML query plan 22. In a write operation, the XML items collection engine 24 formats a stream of XML items output from the executing XML query plan 22 into a format suitable for receipt by the Internet service 11, for storage in the XML documents 12, or for storage or receipt by another repository of XML items. Rather than storing or transmitting the output of the executing XML query plan 22, the output can be displayed on a display 26 or otherwise communicated to a user.

More specifically, the compilation processor 20 includes various components for transforming and optimizing the textual XML query 14 to produce the executable XML query plan 22. In the exemplary illustrated embodiment, a textual XML query parser 30 parses the textual XML query 14 to produce a parsed XML query from which a data flow modeler 32 produces an equivalent data flow model. The data flow model format is convenient for performing query rewrite and optimization of the XML query prior to conversion to executable code.

The data flow model is analyzed by a query rewrite processor 34 which employs heuristic, cost-based, or other methods to identify query rewrites that improve or are likely to improve efficiency of the XML query. The query rewrite processor 34 performs identified query rewrites if it can determine that the rewrite is safe, that is, if it can determine the making the rewrite will not alter the output of the query.

In accordance with embodiments of the invention, a pre-filter 35 determines an expression that will act as a pre-filter for the XML Query. The function of the pre-filter is based on the consideration that, given almost any XPath inside of XQuery, one can determine an expression which will act as a pre-filter. By annotating the original query with this pre-filter, the semantic remains unchanged. Given some of the unique properties of the pre-filter 35, the query rewrite processor 34 can apply certain rewrites in a much more powerful way. This enables better index usage and better execution behavior.

The concept of the pre-filter 25 begins with an observation in XPath:

$$\$i[e1]/e2 = \$i[e1][e2]/e2 \qquad (1)$$

where e1 is a filter and e2 is a deterministic XQuery expression. Note that e1 is not required to be present leading to $\$i/e2 = \$i[e2]/e2$).

Now we can express $\$i[e1]/e2$ as:

$$\$i[e1]/e2 ==>$$

1. for $\$imp$ in $\$i[e1][e2]$ return $\$imp/e2$, if $\$i$ is provably singleton or 2. let $\$return := \$i[e1]/e2$ where $fn{:}exists(\$i[e1][e2])$], otherwise. \qquad (2)

Hence, this gives us a pre-filter $i[e1][e2] which can be optionally applied. Also, note that $$fn\text{:exists}(\$i[e1]/e2) ===> fn\text{:exists}(\$i[e1][e2]) \quad (3)$$

is a correct rewrite using just the pre-filter and dropping the original expression. The significance of expressions 1, 2 and 3 is that the pre-filter is an XPath of the form $i[filter] which enables a far more aggressive push down behavior since the pre-filter will only cause $i to be discarded. In other words, it does not change the items being flowed.

Consider the following example (omitting other rewrites for simplicity):

```
for $i in for $j in T/a return $j
for $j in $i/b[c = 10]
for $k in $i/d[e > 5]
return $k
```

Note that we cannot push $i/b[c=10]nor $i/d[e>5] into the nested FLOWR since both of the two would change the data flow the other expression is dependent upon. However, using a pre-filter as described above one can rewrite the query into (with subsequent other rewrites applied):

```
for $i in for $j in T/a[b[c = 10] and d[e > 5]] return $j
for $j in $i/b[c = 10]
for $k in $i/d[e > 5]
return $k
``` thus enabling potential index usage. Also, other rewrites might also benefit from this.

Expression 3 above allows us to rewrite fn:exists queries and XMLEXISTS queries into the form of fn:exists($i[fn:exists([e1]/e2)]) which allows a much better early-out behavior since we do not have to construct any items dictated by e2.

In another example consider the XML Query:

$i/person/phone[ac=408]==

$i[person/phone[ac=408]]/person/phone[ac=408] (4)

In expression (4) by using the pre-filter person/phone[ac=408]

all phone numbers not having 408 as the area code are filtered out. This may be done using an index. Without the pre-filter all area codes would have to be navigated. By removing the unwanted area codes the performance is significantly improved. The performance improvement can be significant because, between the execution of the pre-filter and the original expression, there may be other costly operations which benefit from a reduction of data being flowed early on. In addition, this is accomplished without raising the multiple consumer problem.

Referring again to FIG. 1, the query rewrite processor 34 will use the pre-filter 35 to create a pre-filter using the above-described methods. An index matcher 37 will also be used by the query rewrite processor 34 to make use of any appropriate indices that are available. Once the query rewrite processor 34 identifies a data stream that is indicated as being advantageously transformed, it examines the expression that receives the data stream to determine whether or not the conversion can be safely performed. This expression examination suitably may include analyzing the evaluation of the expression and its resulting data stream using an evaluation properties calculator 36 to compute a plurality of properties that indicate what type or types of quantifier transformations can be safely performed. That is, a determination is made as to whether the data stream transformation can be performed without possibly corrupting the XML query by changing the result of the evaluation of the expression under consideration. Also, the upper join operates under potentially significant less data, since rows not adhering to the filter conditions are discarded earlier during processing.

With continuing reference to FIG. 1, the query rewrite processor 34 performs one or more query rewrite operations on the data flow model representing the XML query. Preferably, the query rewrite processor 34 operates iteratively, in that after the data flow model is analyzed and one or more query rewrite operations are performed, the analysis of the data flow model is repeated to determine whether the previous query rewrite operations have produced a transformed data flow model in which additional query rewrites are indicated.

Once the query rewrite processor 34 determines that further query rewrite operations are not indicated, the data flow model, as modified by processing performed by the query rewrite processor 34, is input to a query optimizer 40. The query optimizer 40 performs optimizations based on a costing analysis of physical operators of the data flow model to provide greater XML query efficiency. An execution compiler 42 compiles the data flow model after optimization into the executable XML query plan 22 which is suitable for execution.

The components of the XML query compilation processor 20 are exemplary only. Those skilled in the art can readily modify the described XML query compilation processor 20 to suit specific XML query syntaxes or languages, specific applications, specific database management system configurations, and the like. For example, if the XML query is provided to the XML query compilation processor in a non-textual format rather than as the textual XML query 14, then the text parser 30 is suitably omitted.

In another contemplated embodiment, the data flow modeler 32 is omitted, in which case the query rewrite processing is suitably performed on the parsed XML query or on the executable XML query plan. Alternatively, a plurality of data flow modeling processors can be employed to implement a plurality of data flow model formats. For example, another data flow modeler is optionally inserted between the query rewrite processor 34 and the query optimizer 40 to optimize the data flow model format for processing by the query optimizer 40.

Still further, although the XML query rewrite processor 34 is shown in FIG. 1 as a separate component, it is contemplated to integrate XML query rewrite operations into the data flow modeler 32, to integrate the XML query rewrite processor 34 and the query optimizer 40 into a single component that performs both query rewrites and query optimization, or to otherwise modify the XML query compilation processor 20.

The compilation processor 20 is typically implemented using one or more computer programs, each of which executes under the control of an operating system, such as OS/2, Windows, DOS, AIX, UNIX, MVS, or so forth, and causes a computer (not shown) to perform the desired XML query compilation processing as described herein. Thus, using the present specification, the compilation processor 20 may be implemented as a machine, process, or article of manufacture by using standard programming and/or engineering techniques to produce software, firmware, hardware or any combination thereof.

Figure 2:
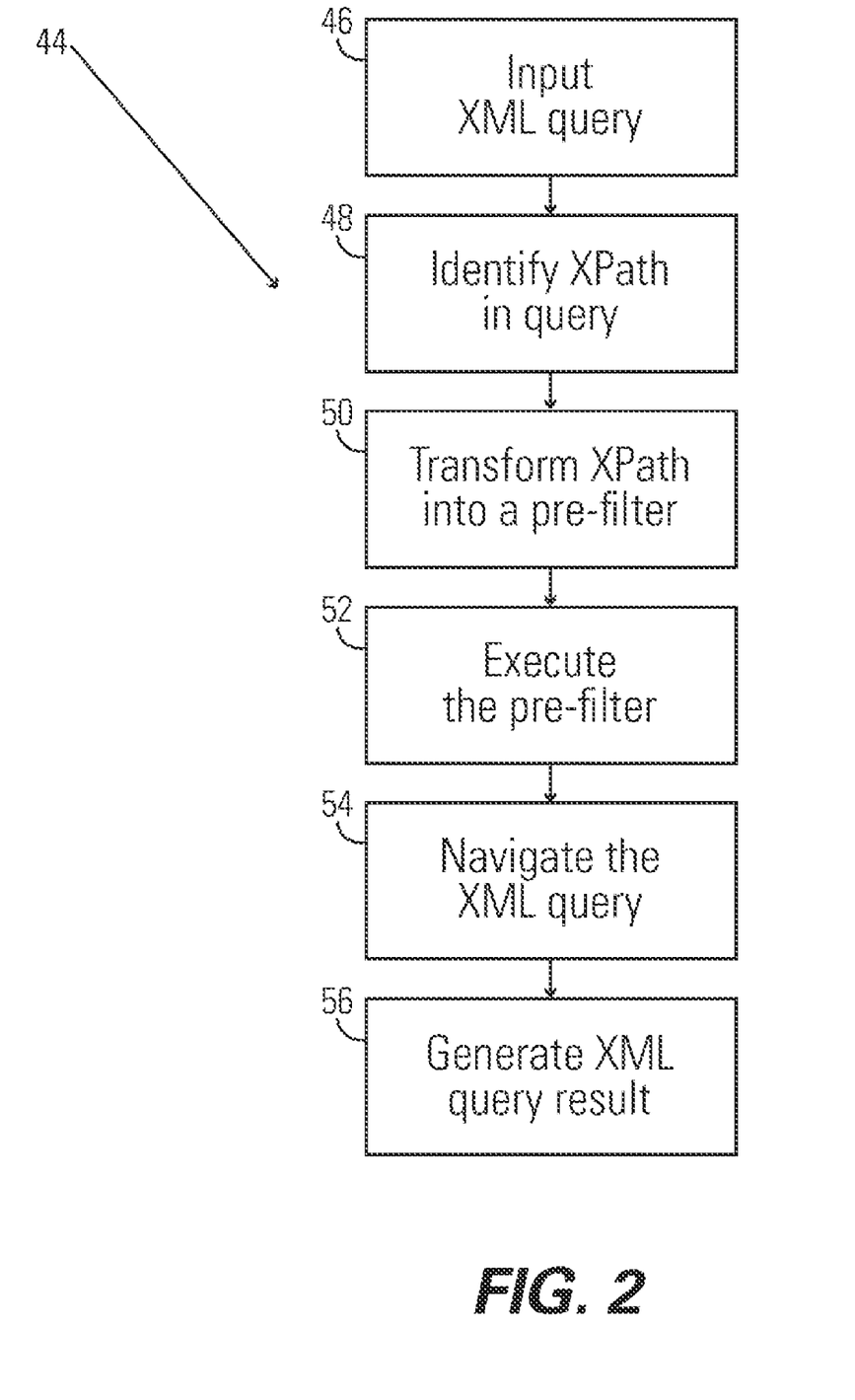
FIG. 2 shows a flow chart of a method of XQuery processing using pre-filters.

FIG. 2 is a flow chart of a method for XQuery processing in accordance with an embodiment of the invention. In particular, a process 44 begins with the input of an XML query in step 46. The XPath in the XML is then identified in step 48. The XPath is then transformed into a pre-filter in step 50. The pre-filter is then executed as indicated by step 52. The XML query is then navigated in step 54 and an XML query result is then generated in step 56. By executing the pre-filter in step 52, before the original XML query, in step 54, unwanted data is removed early on. This may benefit other costly operations by reducing data being flowed early on. The result may be a significant run-time improvement.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
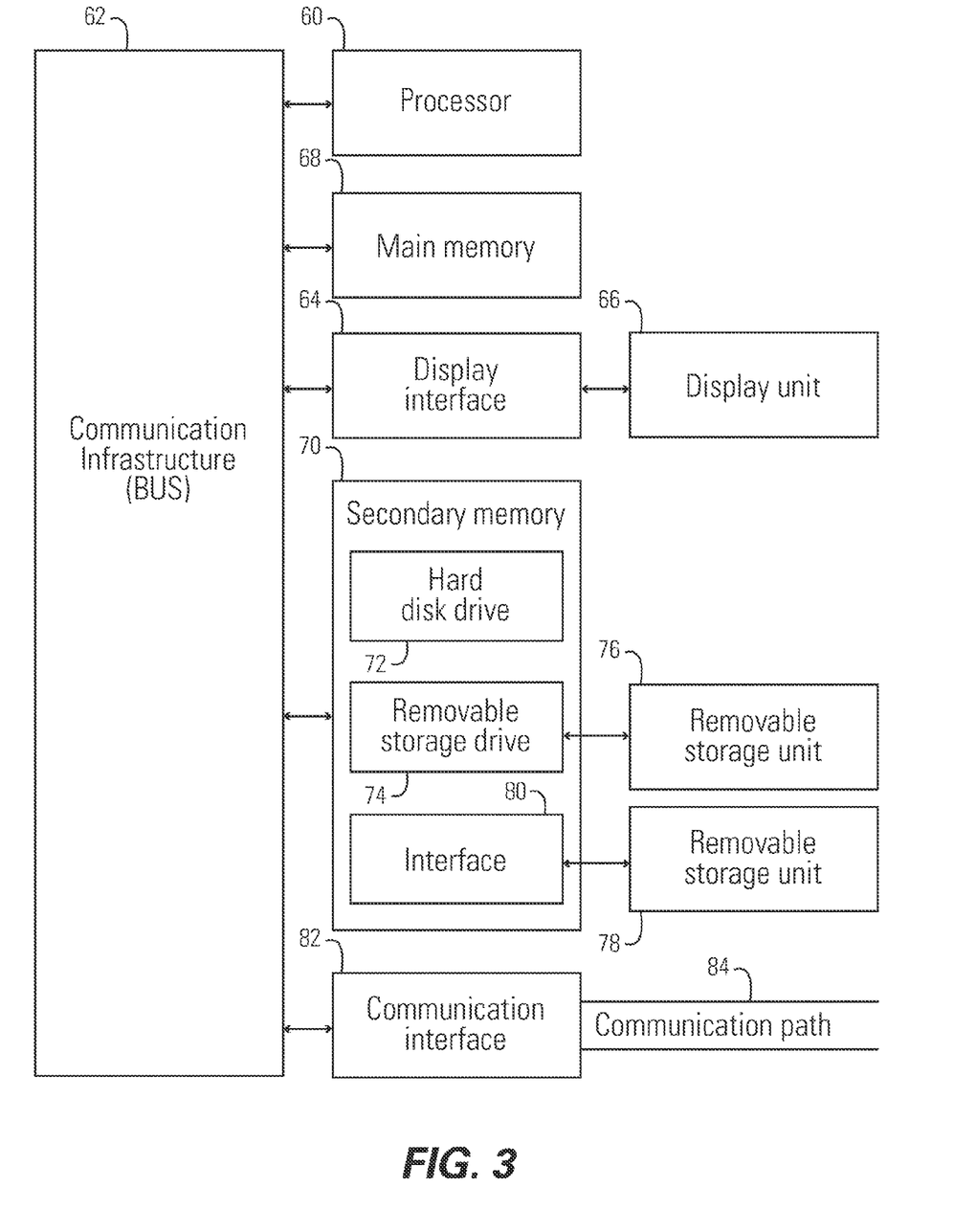
FIG. 3 is a high level block diagram showing an information processing system useful for implementing one embodiment of the present invention.

FIG. 3 is a high level block diagram showing an information processing system useful for implementing one embodiment of the present invention. The computer system includes one or more processors, such as processor 60. The processor 60 is connected to a communication infrastructure 62 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 64 that forwards graphics, text, and other data from the communication infrastructure 62 (or from a frame buffer not shown) for display on the display unit 66. The computer system also includes a main memory 68, preferably random access memory (RAM), and may also include a secondary memory 70. The secondary memory 70 may include, for example, a hard disk drive 72 and/or a removable storage drive 74, representing a floppy disk drive, a magnetic tape drive, an optical disk drive, etc. The removable storage drive 74 reads from and/or writes to a removable storage unit 76 in a manner well known to those having ordinary skill in the art. Removable storage unit 76, represents a floppy disk, a compact disc, magnetic tape, optical disk, etc. which is read by and written to by removable storage drive 74. As will be appreciated, the removable storage unit 76 includes a computer readable medium having stored therein computer software and/or data.

In alternative embodiments, the secondary memory 70 may include other similar means for allowing computer programs or other instructions to be loaded into the computer system. Such means may include, for example, a removable storage unit 78 and an interface 80. Examples of such may include a program cartridge and cartridge interface (such as that found in video game devices), a removable memory chip (such as an EPROM, or PROM) and associated socket, and other removable storage units 78 and interfaces 80 which allow software and data to be transferred from the removable storage unit 722 to the computer system.

The computer system may also include a communications interface 82. Communications interface 82 allows software and data to be transferred between the computer system and external devices. Examples of communications interface 82 may include a modem, a network interface (such as an Ethernet card), a communications port, a PCMCIA slot and card, etc. Software and data transferred via communications interface 82 are in the form of signals which may be, for example, electronic, electromagnetic, optical, or other signals capable of being received by communications interface 82. These signals are provided to communications interface 82 via a communications path (i.e., channel) 84. This channel 84 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 68 and secondary memory 70, removable storage drive 74 and a hard disk installed in hard disk drive 72. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allows a computer to read such computer readable information.

Computer programs (also called computer control logic) are stored in main memory 68 and/or secondary memory 70. Computer programs may also be received via communications interface 82. Such computer programs, when executed, enable the computer system to perform the features of the present invention as discussed herein. In particular, the computer programs, when executed, enable the processor 60 to perform the features of the computer system. Accordingly, such computer programs represent controllers of the computer system.

In accordance with the present invention, we have disclosed systems and methods for creating pre-filters to achieve more efficient Query processing. Those of ordinary skill in the art will appreciate that the teachings contained herein can be implemented using many kinds of software and operating systems, including, but not limited to, XML-enabled database systems such as relational databases and native XML databases as well as middleware such as query gateways, federation, and information integration. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

I claim:

1. An XML query rewrite method comprising:
    transforming, via an execution compiler included in an XML compilation processor executable via hardware or a combination of hardware and software, an XML query into an XML query plan, said transforming into said XML query plan comprising:
    identifying an XPath within said XML query using a query rewrite processor included in said XML compilation processor; and
    transforming, via query transformation on said XML query, said XPath into a pre-filter of said XML query using said query rewrite processor, wherein said query rewrite processor is adapted to perform said query transformation by transforming the expression:
        $i[e1][e2] into the expression $i[e1][e2]/e2, wherein e1 is a filter and e2 is a deterministic XQuery expression, and wherein subsequent to said transforming of the expression, applying said XML query to a sequence of XML items selected from a group consisting of: a sequence of XML items extracted from one or more extensible markup language (XML) documents, a sequence of XML items supplied by an Internet service, a sequence of HTML items extracted from one or more hypertext markup language (HTML) documents, and a sequence of HTML items supplied by an Internet service.

2. The method of claim 1 further comprising executing said prefilter.

3. The method of claim 2 further comprising executing said XML query after said execution of said pre-filter.

4. The method of claim 3 further comprising eliminating data using said pre-filter before executing said XML query.

5. The method of claim 1 further comprising:
    finding an index that matches said pre-filter.

6. An XML query rewrite method for processing an XML query, said XML query rewrite method comprising:
    transforming, via an execution compiler included in an XML compilation processor executable via hardware or a combination of hardware and software, an XML query into an XML query plan, said transforming into said XML query plan comprising:
    identifying an XPath within said XML query using a query rewrite processor included in said XML compilation processor; and
    transforming, via query transformation on said XML query, said XPath into a pre-filter of said XML query using said query rewrite processor, wherein said query rewrite processor is adapted to perform said query transformation by transforming the expression:
        $i[e1][e2] into the expression $i[e1][e2]/e2, wherein e1 is a filter and e2 is a deterministic XQuery expression, and wherein subsequent to said transforming of the expression, applying said XML query to a sequence of XML items selected from a group consisting of: a sequence of XML items extracted from one or more extensible markup language (XML) documents, a sequence of XML items supplied by an Internet service, a sequence of HTML items extracted from one or more hypertext markup language (HTML) documents, and a sequence of HTML items supplied by an Internet service.

7. The method of claim 6 further comprising eliminating data using said pre-filter before executing said XML query.

8. The method of claim 6 further comprising finding an index that matches said pre-filter.

9. A system comprising:
    hardware or a combination of hardware and software, and an XML compilation processor, said XML compilation processor comprising:
    an execution compiler transforming an XML query into an XML query plan; and
    a query rewrite processor identifying an XPath within said XML query, and transforming, via query transformation on said XML query, said XPath into a pre-filter of said XML query using said query rewrite processor, wherein said query rewrite processor is adapted to perform said query transformation by transforming the expression:
        $i[e1][e2] into the expression $i[e1][e2]/e2, wherein e1 is a filter and e2 is a deterministic XQuery expression, and wherein subsequent to said transforming of the expression, applying said XML query to a sequence of XML items selected from a group consisting of: a sequence of XML items extracted from one or more extensible markup language (XML) documents, a sequence of XML items supplied by an Internet service, a sequence of HTML items extracted from one or more hypertext markup language (HTML) documents, and a sequence of HTML items supplied by an Internet service.

10. The system of claim 9 wherein said execution compiler eliminates data using said pre-filter before said XML query is executed.

11. The system of claim 9 further comprising:
    an index matcher for finding an index that matches said pre-filter.

12. The system of claim 9 further comprising:
    textual XML query parser for providing a parsed XML query; and
    query optimizer for optimizing data flow.

13. The system of claim 12 further comprising a data flow modeler for receiving said parsed XML query and producing an equivalent data flow model.

14. The system of claim 13 further comprising an execution compiler for compiling a data flow model into an executable XML query plan.

15. A computer program product for querying an XML document, said computer program product comprising:
- a computer readable storage medium, wherein said computer readable storage medium is selected from a group consisting of an electronic device, a magnetic device, an optical device, an electromagnetic device, an infrared device, a semiconductor device, a semiconductor memory, a solid state memory, a magnetic tape, a removable computer diskette, a random access memory (RAM), a read-only memory (ROM), a rigid magnetic disk, an optical disk, a compact disk—read-only memory (CR-ROM), a compact disk—read/write (CD-R/W), and a DVD, said computer readable storage medium having computer readable program code embodied therewith, said computer readable program code comprising:
- computer readable program code configured to:
- transforming, via an execution compiler included in an XML compilation processor, an XML query into an XML query plan, said transforming into said XML query plan comprising:
  - identifying an XPath within said XML query using a query rewrite processor included in said XML compilation processor; and
  - transforming, via query transformation on said XML query, said XPath into a pre-filter of said XML query using said query rewrite processor, wherein said query rewrite processor is adapted to perform said query transformation by transforming the expression:
    - $i[e1][e2] into the expression $i[e1][e2]/e2, wherein e1 is a filter and e2 is a deterministic XQuery expression, and wherein subsequent to said transforming of the expression, applying said XML query to a sequence of XML items selected from a group consisting of: a sequence of XML items extracted from one or more extensible markup language (XML) documents, a sequence of XML items supplied by an Internet service, a sequence of HTML items extracted from one or more hypertext markup language (HTML) documents, and a sequence of HTML items supplied by an Internet service.

16. The computer program product of claim 15 wherein an index is matched to said pre-filter.

* * * * *